UNITED STATES PATENT OFFICE.

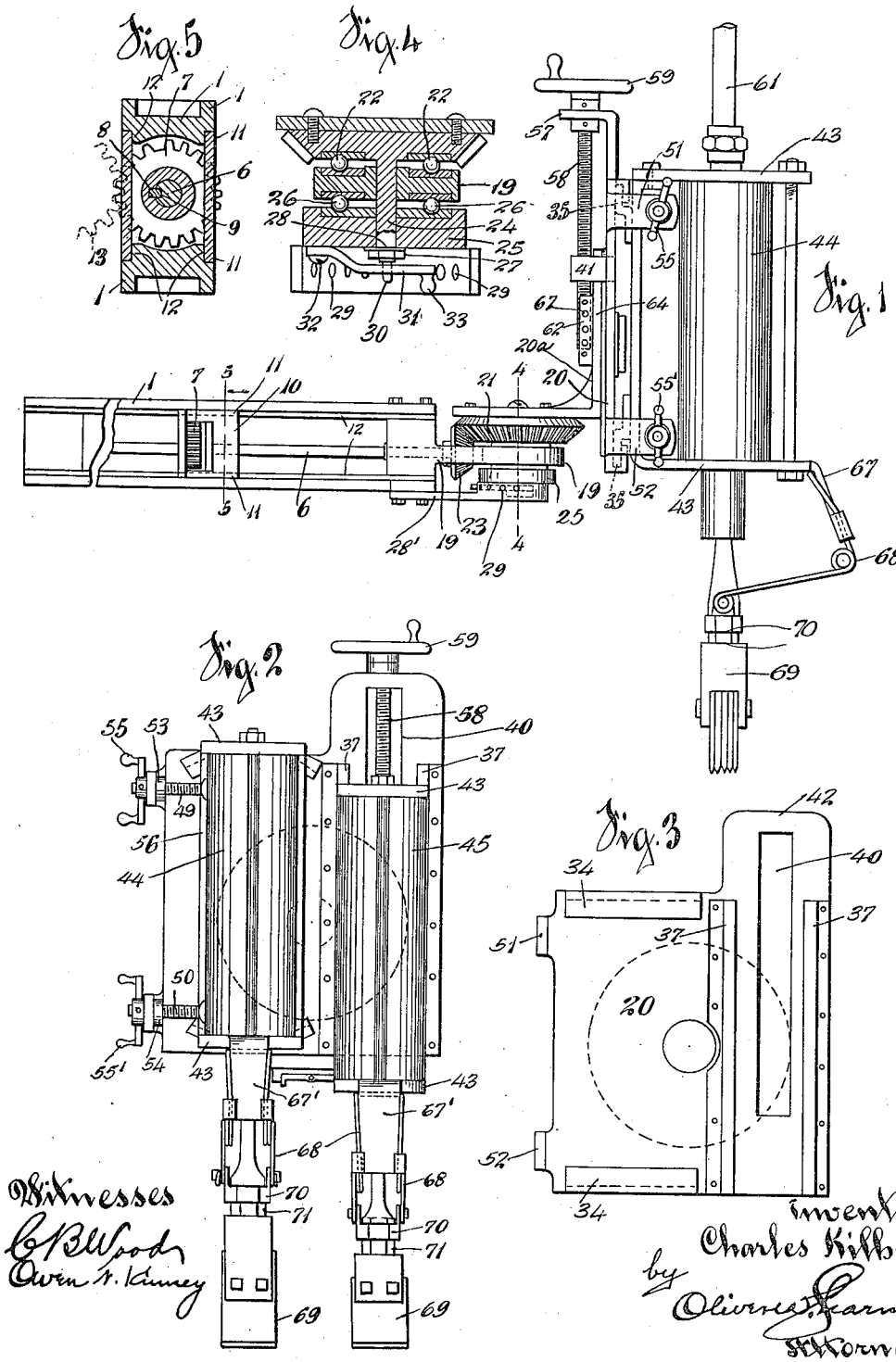

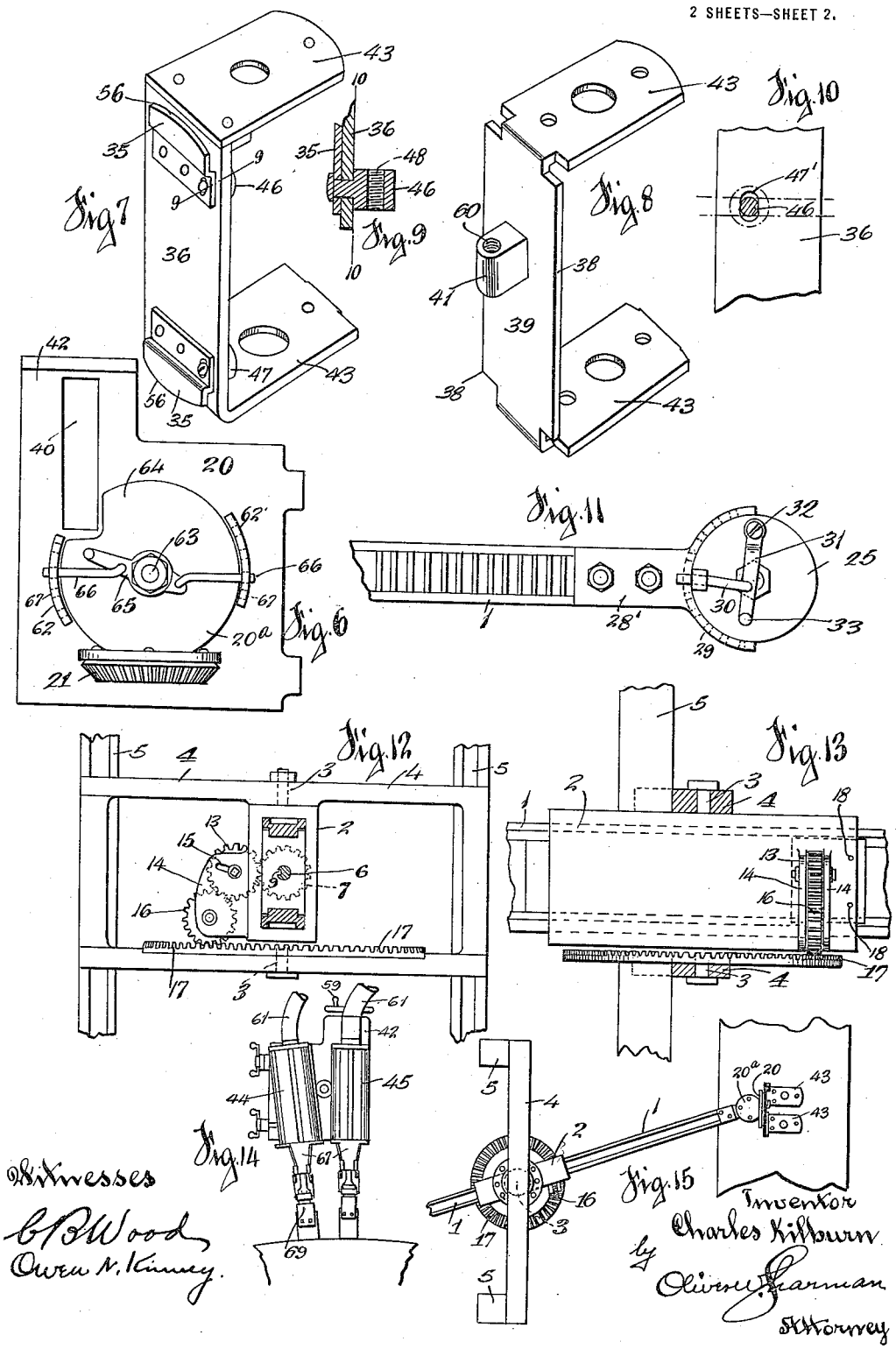

CHARLES KILBURN, OF CINCINNATI, OHIO.

STONE-CUTTING TOOL.

1,158,811. Specification of Letters Patent. Patented Nov. 2, 1915.

Application filed July 10, 1913. Serial No. 778,237.

*To all whom it may concern:*

Be it known that I, CHARLES KILBURN, a citizen of the United States, residing at Cincinnati, in the county of Hamilton and State of Ohio, have invented certain new and useful Improvements in Stone-Cutting Tools, of which the following is a specification.

My invention relates to stone cutting tools and more particularly to improvements in the tool heads usually employed on stone surfacing machines, and placed on the ends of the tool beams.

The object of my invention is to provide a tool beam head which is adapted to carry a plurality of pneumatic hammers adjustable relatively to each other on the tool beam head in order to cut different shaped surfaces.

It is a further object of my invention to provide a tool beam head carrying a plurality of pneumatic hammers, the head being adjusted to reciprocate with the swinging movement of the tool beam, thereby carrying the pneumatic hammers in a line parallel with the edge of the surface being cut, or in other words, parallel with a line through the center of the standard.

In the drawings: Figure 1 is a side elevation of a tool beam equipped with my invention. Fig. 2 is a front elevation of same. Fig. 3 is a front elevation of my improved tool beam head, the parts adapted to be mounted thereon being removed. Fig. 4 is a cross-section taken on the line 4—4 of Fig. 1. Fig. 5 is a cross-section taken on the line 5—5 of Fig. 1. Fig. 6 is an elevation view of my improved tool beam head looking at the opposite side from that shown in Fig. 3. Figs. 7 and 8 are perspective views of the pneumatic hammer brackets which are adapted to be mounted on the tool beam head. Fig. 9 is a fragmentary horizontal section taken substantially on the line 9—9 of Fig. 7. Fig. 10 is a cross-section taken on the line 10—10 of Fig. 9. Fig. 11 is a view looking at the bottom of the tool beam showing means of locking the tool beam head against reciprocating movement. Fig. 12 is an elevation of a fragment of a stone surfacing machine standard having a pivoted tool beam holder mounted thereon, the tool beam being shown in cross-section and the stone surfacing machine standard being provided with the necessary elements for coöperation with my improved device. Fig. 13 is a side elevation of that portion of the device shown in Fig. 12, part of the surfacing machine standard being shown in cross-section for the sake of clearness. Fig. 14 shows an end view of my improved tool beam head, the pneumatic hammers being adjusted thereon to illustrate how a convex surface may be cut. Fig. 15 is a plan view of a stone surfacing machine standard illustrating a tool beam mounted thereon, equipped with my invention and showing the reciprocating movement imparted to the tool beam head when the tool beam is swung on its pivot on the surfacing machine standard. (This view also illustrates the manner in which the pneumatic hammers are maintained in a line parallel with a similar line drawn through the axis or central part of the stone surfacing machine standard.)

Referring more particularly to the drawings, 1 illustrates a tool beam being mounted in a pivoted tool beam holder 2 (Figs. 12 and 13), said tool beam holder being pivoted at 3, on the cross brace 4 of the stone surfacing machine standard 5. The tool beam 1 is slidably mounted in said beam holder 2 and is provided with a shaft 6 running longitudinally along the center of the tool beam and is provided with a pinion gear 7 fastened by means of a key or feather 8, adapted to slide in a splineway or keyway 9 in the shaft 6. Surrounding said pinion gear 7 I provide a slidable bracket 10 which is provided with flanges 11 at the top and bottom, which are adapted to engage the shoulders 12 on the tool beam.

The pinion gear 7 is adapted to mesh with a gear 13 (Fig. 12) which is mounted in an extension 14 formed integral with the tool beam holder 2 and its journals are preferably mounted in an elongated slot 15 in the extension 14. Thus the gear wheel 13 may be moved along the slot 15 and be thrown out of mesh with the pinion gear 7 on the shaft 6. Another gear wheel 16 is mounted in the extension 14 and intermeshes with said gear wheel 13 and a circular gear rack 17, which is mounted on the cross brace 4 of the standard 5. Thus when the tool beam and tool beam holder are operated on the pivot 3, the gear wheel 16 will mesh with the gear rack 17 and thereby impart movement through gears 13 and pinion gears 7 to the shaft 6. At the same time the tool beam may be moved longitudinally relatively to the tool beam holder, and the pinion gear 7 mounted on the shaft 6 will maintain its position relative to the tool beam holder, due to the fact that it is slidably connected to said shaft 6, and the bracket 10 surrounding same being also slidably connected to said tool beam, and the bracket 10 being suitably fastened to the tool beam holder 2 as by means of rivets or screws 18 (Fig. 13.)

An extension 19 is provided on the end of the tool beam upon which the tool beam head 20 is pivoted. The tool beam head 20 is provided with a bevel gear wheel 21 which is securely fastened to the bottom thereof, and which is adapted to rotate on ball-bearings 22. The shaft 6 in the tool beam is provided with a pinion bevel gear 23 and extends beyond the end of the tool beam proper and meshes with said bevel gear 21, so that when shaft 6 is rotated, the bevel pinion 23 is also rotated, which rotates the bevel gear 21 thereby rotating the tool beam head 20. The bevel gear 21 is provided with a central pin or projection 24 which projects down through the extension 19 and passes through an annular bearing plate or collar 25 which is also provided with ball-bearings 26 disposed between said collar and said extension 19 and rotates with the said pin. The collar 25 is held in position by means of the nut and washer illustrated at 27, the washer bearing against the shoulder 28 on the vertical pin 24. It is sometimes desirous to use the tool beam with a rigid head, that is, a head which is fastened to the tool beam in such a manner as to become rigid therewith and not turn. I therefore provide an arm 28' on the bottom of the tool beam which extends down toward the bearing collar 25 and is bifurcated at that point to form a pair of forks constituting a semi-circle underneath said collar 25. A series of apertures 29 are provided in the forks on the arm 28' into which the pin 30 is adapted to enter. The pin 30 is fastened to a lever arm 31 which is pivoted at 32 to the collar 25. (Fig. 4.) The pin 30 is fastened to said lever arm 31 at a point between the pivot 32 and the handle 33 so that when the lever arm 31 is swung upon its pivot, it draws the pin 30 from engagement with the aperture 29 in which it happens to be lodged. Thus the tool beam head may be held from rotation by inserting the pin 30 in one of the apertures 29.

The tool beam head 20 is provided with turned down horizontal flanges 34 at the top and bottom thereof, (Fig. 3) thereby forming a channel in which the tongues 35 on the bracket 36 are adapted to operate. The head 20 is also provided with vertical flanges 37 which form vertical channels in which the flanges 38 on the bracket 39 are adapted to operate. The vertical slot 40 is also provided, in between the vertical flanges 37, to allow the projection 41 on the bracket 39 to pass up and down while mounted on the tool beam head 20. In order to provide the proper length of travel for the bracket 39, a tool beam head is provided with an upwardly extending portion 42, the slot 40 passing up into said extension. The pneumatic hammer brackets 36 and 39 are provided with the necessary horizontal extending portions 43 in which the pneumatic hammers 44 and 45 are mounted in the customary manner. The bracket 36 is provided with lugs 46 and 47 which are pivoted to the back of the bracket 36 and are allowed a certain amount of vertical play upon said bracket. These lugs are tapped as shown at 48 (Fig. 9) which receive threaded studs 49 and 50. These studs 49 and 50 are mounted in the extending brackets 51 and 52 which are mounted on the tool beam head 20 as best shown in Figs. 2 and 3. The collars 53 and 54 are provided on one side of the extension brackets 51 and 52 on the threaded studs 49 and 50 respectively. The handle heads 55 and 55' are fastened to said studs 49 and 50 respectively on the other side of said extending brackets 51 and 52. These handle heads and collars are fastened tight to said studs to maintain their lateral position while turning inside extending brackets 51 and 52. Thus when the handle heads are operated, the lugs 46 and 47 are drawn to and from the extending brackets 51 and 52 on the tool beam head, thereby adjusting the position of the pneumatic hammer bracket 36 on the tool beam head 20. It will be noted that the tongues 35 which are mounted on the back of the pneumatic hammer bracket 36 form a convex surface 56 which allows the bracket to tilt diagonally with relation to the tool beam head, and thereby assume a position such as that shown in Fig. 14. This pneumatic hammer bracket may be tilted in either direction to cut concave or convex surfaces, while at the same time it is capable of lateral adjustment with relation to the tool beam head. It will be seen that as the pneumatic hammer bracket 36 is being tilted diagonally, that it is necessary for the lugs 47 to rotate a trifle to adjust themselves to the studs 49 and 50. It will also be noted that they must be provided with a small vertical play in the pneumatic hammer bracket. This is accomplished by setting studs 46 and 47 in an elongated slot 47'. (Fig. 10.)

The other pneumatic bracket is adjustable vertically, the tool beam head having a rearwardly extending flange portion 57 thereon, in which a threaded stud 58 is mounted, said stud having a handle 59 thereon, and at the top thereof for rotating said stud. The stud 58 passes down through a tapped opening 60, located in the lug 41 on the pneumatic hammer bracket 39. Thus when the handle 59 is rotated, the pneumatic hammer bracket 39 is raised or lowered, whichever is desired, relative to the tool beam head. The pneumatic hammers are fed with compressed air through the customary hose 61.

It is sometimes desirous to tilt the entire tool beam head so as to bring the vertical pneumatic hammer bracket 39 a little off center, or in other words, radial to the concave or convex surfaces of the stone being surfaced. For instance, by referring to Fig. 14, it is seen that it might be desirous to center the tool beam head and the stone to be surfaced, so that they are in absolute vertical alinement. This could readily be done by moving the stone or machine a short distance laterally and tilting the tool beam head in order to properly adjust the pneumatic hammers to the proper position on the surface of the stone. This is accomplished by providing two segmental flanges 62 which are on the tool beam head 20. The tool beam head 20 is pivoted on a shaft or pin 63 which is mounted in the upright annular extension 64 of the angular member 20ᵃ of the tool beam head. Pivoted on the shaft 63 I provide an arm 65 to which are attached pins 66 which are adapted to enter apertures 67 in the segmental flanges 62 (Fig. 6). Thus it is seen that by rotating the arm 65 the pins 66 may be disengaged from the apertures in the segmental flanges 62 and thereby release their hold on same and allow the tool beam head to rotate on the angular member 20ᵃ to whatever point desired.

It is evident from the construction shown and described, that I have produced a tool beam head which allows for the adjustment of a plurality of pneumatic hammers thereon, and which is itself automatically oscillated with relation to the tool beam when the tool beam is swung on its pivot, thereby allowing for the cutting of surfaces of various shapes and sizes. For instance, if a bead is required to be cut on a stone, both sides of said bead may be cut by properly spacing the pneumatic hammers with relation to one another. Also a greater amount of plane surfacing can be done inasmuch as a plurality of pneumatic hammers are provided which will cover a greater amount of space in a shorter length of time than by using one pneumatic hammer. The oscillating movement of the tool beam head is best shown in Fig. 15 where it is seen that if it was not for the oscillating movement of the tool beam head that the cutting of the surface of the stone would not be uniform inasmuch as the surfacing tools would be disposed diagonally with relation to the stone at each side of the limit of the stroke of the tool beam, and would be straight at the center of the stroke.

The pneumatic hammer brackets 36 and 39 are provided with downwardly extending arms 67 upon which springs 68 are mounted. These springs are an important feature in the proper operation of the device inasmuch as it is their function to hold the surfacing tools 69 in proper contact with the pneumatic hammers. The springs have mounted on the end thereof a hexagonal shaped member 70, and the shanks 71 of the tools are also hexagonal in shape to prevent them from turning relatively to the pneumatic hammers and prevent the tools 69 from being disposed in a diagonal position for surfacing the stone.

It is believed that many disadvantages which are now experienced by the use of the customary surfacing machine are overcome in this device, it being possible to cut various stones of many shapes and sizes.

What I claim as new and desire to secure by Letters Patent is:

1. In combination with a standard, of a tool beam pivoted thereon, means for swinging the tool beam on its pivot, a tool beam head, hammer supporting members mounted on said head, means for tilting said tool beam head, means for tilting one of said hammer supports on said tool beam head, means for adjusting the other hammer supporting member perpendicularly to the operating plane of the hammer, and means for reciprocating said tool beam head when said tool beam is swung on its pivot.

2. In combination with a standard, of a tool beam pivoted thereon, a tool beam head on said tool beam, a plurality of pneumatic hammers on said tool beam head, means for oscillating said tool beam head as the tool beam is swung on its pivot.

3. In combination with a standard having a tool beam holding member pivoted thereon, of a tool beam mounted in said holding member, a head pivoted on the end of said tool beam, brackets on said head to carry pneumatic hammers thereon, and coöperating mechanism on said tool beam, said tool beam holding member, and said standard, for imparting movement to said tool beam head when said tool beam holder is operated on its pivot on said standard.

4. In combination with a standard having a tool beam holding member pivoted thereon, a tool beam slidably mounted thereon, a circular gear rack on said standard, a shaft disposed longitudinally on said tool beam, a pinion gear slidably mounted on said shaft, a slidable bracket on said tool beam surrounding said pinion gear, an intermeshing gear between said pinion gear and said circular gear rack, a bevel pinion gear at the end of said shaft, a head pivoted on the end of said tool beam having a bevel gear mounted thereon, and being adapted to mesh with said bevel pinion gear on said shaft to rotate said head on its pivot, and a plurality of pneumatic hammer brackets on said head.

5. In combination with a standard, of a tool beam pivoted thereon, a tool beam head mounted thereon, means for oscillating said tool beam head when said tool beam is swung on its pivot, a hammer bracket mounted on said tool beam head, and means for adjusting said bracket in a line parallel with the axis of said tool beam.

6. In combination with a standard, of a tool beam pivoted thereon, a tool beam head mounted thereon, a pair of brackets mounted on said tool beam head, means for adjusting one of said brackets in a line parallel with the axis of said tool beam, means for tilting the other bracket with relation thereto, means for oscillating said tool beam head when said tool beam is swung on its pivot, pneumatic hammers mounted in said brackets.

7. In combination with a standard, of a tool beam pivoted thereon, a tool beam head on said tool beam, means for tilting said tool beam head, means for oscillating said tool beam head while the tool beam is swung on its pivot and means on said tool beam head for supporting pneumatic hammers.

8. In combination with a standard, of a tool beam pivoted thereon, mechanism for swinging said tool beam on its pivot, a tool beam head, hammer supporting members mounted on said head, means for tilting one of said hammer supporting members on said tool beam head, and means for adjusting the other hammer supporting member perpendicularly to the operating plane of the hammer.

CHARLES KILBURN.

Witnesses:
C. B. Wood,
Oliver W. Sharman.